(12) United States Patent
Lurie et al.

(10) Patent No.: US 8,040,871 B2
(45) Date of Patent: *Oct. 18, 2011

(54) NULL INDICATION IN A SHARED ROBUST SCHEME

(75) Inventors: Aharona Lurie, Or Yehuda (IL); Ronald Bruce Sterenson, Ra'anana (IL)

(73) Assignee: Coppergate Communications Ltd., Tel Aviv (IL)

( * ) Notice: Subject to any disclaimer, the term of this patent is extended or adjusted under 35 U.S.C. 154(b) by 355 days.

This patent is subject to a terminal disclaimer.

(21) Appl. No.: 12/261,170

(22) Filed: Oct. 30, 2008

(65) Prior Publication Data

US 2009/0109991 A1 Apr. 30, 2009

Related U.S. Application Data

(60) Provisional application No. 60/983,615, filed on Oct. 30, 2007, provisional application No. 60/989,658, filed on Nov. 21, 2007.

(51) Int. Cl.
*H04J 3/06* (2006.01)
(52) U.S. Cl. .......... 370/350; 370/338; 370/458
(58) Field of Classification Search .......... 370/338, 370/350, 458, 508–509
See application file for complete search history.

(56) References Cited

U.S. PATENT DOCUMENTS

| 5,359,320 | A | * | 10/1994 | Jaffe et al. ............ 370/448 |
| 7,133,423 | B1 | | 11/2006 | Chow et al. |
| 7,408,949 | B2 | | 8/2008 | Baum |
| 7,603,146 | B2 | * | 10/2009 | Benveniste ............ 455/574 |
| 2004/0141517 | A1 | * | 7/2004 | Balasubramanian et al. 370/462 |
| 2007/0064720 | A1 | | 3/2007 | Sterenson |

\* cited by examiner

*Primary Examiner* — Phuc Tran
(74) *Attorney, Agent, or Firm* — AlphaPatent Associates Ltd.; Daniel J. Swirsky

(57) ABSTRACT

A method implemented on a network node includes receiving an adjustable schedule of transmission start slots, the slots representing opportunities for initiating data transmission by at least one network device on a network, transmitting an expected duration indication in each slot associated with the network node as per the schedule, and adjusting the schedule in accordance with the expected duration for each transmission. A method for virtual carrier sensing includes receiving a schedule of transmission start slots on a network node, the slots representing opportunities initiating data transmission by at least one network device in a network, listening for transmissions by other network nodes according to the schedule, the transmissions indicating an expected length of a current transmission, adjusting the schedule in accordance with the indicating of a data transmission, and ignoring any subsequent transmissions until a next scheduled transmission start slot in accordance with the adjusted schedule.

17 Claims, 3 Drawing Sheets

US 8,040,871 B2

NULL INDICATION IN A SHARED ROBUST SCHEME

CROSS-REFERENCE TO RELATED APPLICATIONS

This application claims benefit from U.S. Provisional Patent Application Nos. 60/983,615, filed Oct. 30, 2007, and 60/989,658, filed Nov. 21, 2007, which are hereby incorporated in their entirety by reference.

FIELD OF THE INVENTION

The present invention relates to data networks generally and to media access allocation in data networks in particular.

BACKGROUND OF THE INVENTION

There are many different types of data networks, of which Ethernet is perhaps the best known. Some data networks have resource reservation schemes. One such network is Home-PNA (Home Phoneline Network Alliance) v3.1, which is designed to work over existing telephone lines to create a home/small office network. U.S. patent application Ser. No. 11/000,524, filed Dec. 1, 2004, and assigned to the common assignee of the present invention, describes generally how to extend the HomePNA v3.1, standard to operate over a hybrid network of telephone and coax lines.

HPNA v3.1, and other such resource reservation networks have a scheduler, described hereinbelow, to guarantee media resources to network devices, to prevent collision between multiple network devices using the same line and to ensure quality of service. In coax networks, preventive collision detection limits the dynamic range of the network devices, which may impose physical limitations on the size of the network, so it is preferable to use collision avoidance methods for media access in coax networks.

Such a collision avoidance method is disclosed in U.S. patent application Ser. No. 11/218,708, entitled 'Collision Avoidance Media Access Method for Shared Networks', filed Sep. 6, 2005, and assigned to the common assignee of the present invention. This application is incorporated herein by reference. The collision avoidance/carrier sensing media access (CA/CSMA) method disclosed in the application employs a media access plan (MAP) having sub-burst slots. Each sub-burst slot has a shorter duration than a minimal transmission burst duration (e.g., 8-32 μsecs), is associated with a particular one or group of network participants, and represents an opportunity for the initiation of a data transmission by its associated network participants.

The MAP for a transmission cycle dictates a schedule of sub-burst slots, wherein numbered sub-burst slots are scheduled in a particular order. FIG. 1A, reference to which is now made, shows an exemplary sub-burst slot schedule 10, in which five sub-burst slots numbered 0 through 4 are scheduled in sequential order. Sub-burst slot schedule 10 may also be seen as a grid of transmission opportunity start times. The start time STN for each sub-burst slot N is the moment at which the network participant associated with sub-burst slot N may begin to transmit.

In the initial grid of transmission opportunity start times (before any transmissions occur), the start time of each sub-burst slot N, $ST_N$, occurs after the sum of the durations of the sub-burst slots preceding sub-burst slot N. For example, as shown in FIG. 1A, the initial start times $STi_0$, $STi_1$, $STi_2$, $STi_3$, and $STi_4$, of sub-burst slots 0-4 respectively, occur at (t=0), (t=$d_0$), (t=$d_0+d_1$), (t=$d_0+d_1+d_2$), and (t=$d_0+d_1+d_2+d_3$) respectively where $d_0$, $d_1$, $d_2$, and $d_3$, are the durations of sub-burst slots 0-4 respectively.

The principal advantage of sub-burst slots over regular sized time slots is that when a network participant does not use its transmission opportunity, minimal time is wasted before the opportunity to transmit is passed to the next network participant in the queue. On the other hand, when a network participant opts to transmit when its turn arrives, the allowable transmission duration is not limited by the short duration of the sub-burst slot. Rather, the sub-burst slot expands to encompass the required transmission burst duration. Accordingly, the start times of the succeeding sub-burst slots are delayed by an amount of time equal to the portion of the transmission duration which exceeds the original sub-burst slot duration. In effect, the entire grid of transmission opportunity start times shifts by this amount.

For example, as shown in FIG. 1B, reference to which is now made, timing diagram 15 for an exemplary transmission cycle operating in accordance with sub-burst slot schedule 10 shows how a transmission during sub-burst slot '1' alters the initial grid of transmission opportunity start times for the sub-burst slots following sub-burst slot '1'. As shown in FIG. 1B, start times $STb_2$, $STb_3$, and $STb_4$, are incremented by x, the portion of the transmission transmitted during sub-burst slot '1' which exceeds the original sub-burst slot duration $d_1$.

In a network employing the CA/CSMA method described hereinabove, all of the participating network nodes receive the MAP and extract from it their relative transmission opportunities. Then they employ physical carrier sensing (PCS) to monitor transmissions occurring over the network so that, subsequent to each transmission, they can synchronize to an updated transmission opportunities (TXOPs) schedule accounting for transmission-induced shifts in the sub-burst slot start time grid.

Successful implementation of PCS is important for optimal operation of collision avoidance as described hereinabove. The carrier sensors in all of the network nodes must receive the same information regarding transmissions occurring over the network in order to guarantee synchronization of all nodes to the same timing and transmission opportunities schedule.

SUMMARY OF THE PRESENT INVENTION

An object of the present invention is to improve upon the prior art.

There is therefore provided, in accordance with a preferred embodiment of the present invention, a method implemented on a network node including receiving an adjustable schedule of transmission start slots, where the transmission start slots represent transmission initiation opportunities for the initiation of data transmission by at least one of a plurality of network devices on a network, transmitting at least an indication of an expected duration in each transmission start slot associated with the network node as per the schedule, and adjusting the adjustable schedule in accordance with the expected duration for each transmission.

Additionally, in accordance with a preferred embodiment of the present invention, the indication is one of an explicit expected duration for a payload transmission, an explicit expected duration for a null frame, and an implied expected duration for a null frame, where the implied expected duration is unchanged from a current expected duration as per the adjustable schedule.

Further, in accordance with a preferred embodiment of the present invention, the transmitting includes transmitting a specific analog preamble to indicate that the network node is not transmitting a data payload and the expected duration is unchanged from a current expected duration.

Still further, in accordance with a preferred embodiment of the present invention, the network uses a powerline medium.

Moreover, in accordance with a preferred embodiment of the present invention, the method also includes listening for transmissions by other network nodes according to the adjustable schedule, the transmissions indicating at least an expected length of a current transmission, and adjusting the received schedule in accordance with the indicating.

Additionally, in accordance with a preferred embodiment of the present invention, the indicating is transmitting at least one of a duration and a null frame.

Further, in accordance with a preferred embodiment of the present invention, the indicating is transmitting an analog preamble.

Still further, in accordance with a preferred embodiment of the present invention, the method also includes processing only the indicating, and ignoring any other components of the transmissions.

Moreover, in accordance with a preferred embodiment of the present invention, the method also includes reducing power consumption by turning off a receiver used for the listening when the transmissions are not expected as per the schedule.

Additionally, in accordance with a preferred embodiment of the present invention, the transmitting also includes information regarding a current transmitting position within the adjustable schedule. Further, in accordance with a preferred embodiment of the present invention, the information identifies at least one of a transmission start slot, the network node, and a group for the network node.

Still further, in accordance with a preferred embodiment of the present invention, the transmission start slots are sub-burst slots.

There is also provided, in accordance with a preferred embodiment of the present invention, a method implemented on a network node including receiving an adjustable schedule of transmission start slots, where the transmission start slots represent transmission initiation opportunities for the initiation of data transmission by at least one of a plurality of network devices in a network, listening for transmissions by other network nodes according to the received schedule, the transmissions at least indicating an expected length of a current transmission, and adjusting the received schedule in accordance with the indicating.

Additionally, in accordance with a preferred embodiment of the present invention, the indicating is transmitting at least one of a duration and a null symbol.

Further, in accordance with a preferred embodiment of the present invention, the indicating is an analog preamble.

Moreover, in accordance with a preferred embodiment of the present invention, the method also includes processing only the indications, and ignoring any other components of the transmissions.

Additionally, in accordance with a preferred embodiment of the present invention, the method also includes reducing power consumption by turning off a receiver used for the listening when the transmissions are not expected as per the schedule.

Further, in accordance with a preferred embodiment of the present invention, the transmitting also includes information regarding a current transmitting position within the adjustable schedule.

Still further, in accordance with a preferred embodiment of the present invention, the information identifies at least one of a transmission start slot, the network node, and a group for the network node.

Moreover, in accordance with a preferred embodiment of the present invention, the method also includes synchronizing the received adjustable schedule in accordance with the information regarding a current transmitting position.

There is also provided, in accordance with a preferred embodiment of the present invention, a method for virtual carrier sensing including receiving a schedule of transmission start slots on a network node, where the transmission start slots represent transmission initiation opportunities for the initiation of data transmission by at least one of a plurality of network devices in a network, listening for transmissions by other network nodes according to the received schedule, the transmissions indicating at least an expected length of a current transmission, adjusting the received schedule in accordance with the indicating of a data transmission, and ignoring any subsequent transmissions until a next scheduled the transmission start slot in accordance with the adjusted schedule.

Additionally, in accordance with a preferred embodiment of the present invention, the listening includes listening for the transmissions from specific other networks nodes, where the identity of the other the network nodes is known as per the received schedule.

Still further, in accordance with a preferred embodiment of the present invention, the method also includes reducing power consumption by turning off a receiver used for the listening when the transmissions are not expected as per the schedule.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

While the HPNA network described in the background is designed to run on telephone lines, other implementations are also possible. For example, HPNA 3.1, may also be implemented on home power lines. It will be appreciated that power lines are not ideal data carriers. They are designed to provide electrical current as needed, and accordingly, they are subject to frequent surges and other possible causes of interference. As media for data transmission they are inherently noisier than telephone lines and/or dedicated data lines.

In such a noisy environment, network synchronization may be lost if one or more of the network nodes miss a transmission over the network due to the intermittent noise that may be typical on power lines. In another scenario, loss of synchronization may occur when noise on the line is incorrectly interpreted by a node as a valid data transmission. An unsynchronized node may then mistakenly identify a transmission opportunity associated with a different node as its own opportunity to transmit, and collisions may occur, increasing the packet error rate (PER). This undesirable situation could continue for a relatively long period of time until a new media access plan (MAP) is publicized and the network nodes are resynchronized.

In the presence of such interference, PCS be problematic when used for powerline media and other methods may be required to maintain synchronization. In accordance with a preferred embodiment of the present invention, timed-reception may be implemented as an alternative to PCS, and the CSMA sub-burst slots media access method may be modified accordingly to achieve a "virtual carrier sensing" (VCS) mode.

Figure 2A:
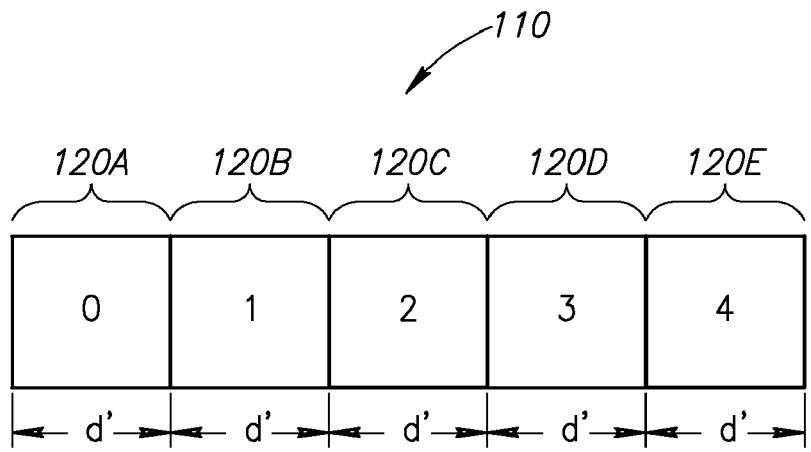
FIG. 2A is an illustration of a novel transmission start slot TDMA (time division multiple access) contention TXOP schedule, designed and operative in accordance with a preferred embodiment of the present invention.
Figure 2B:
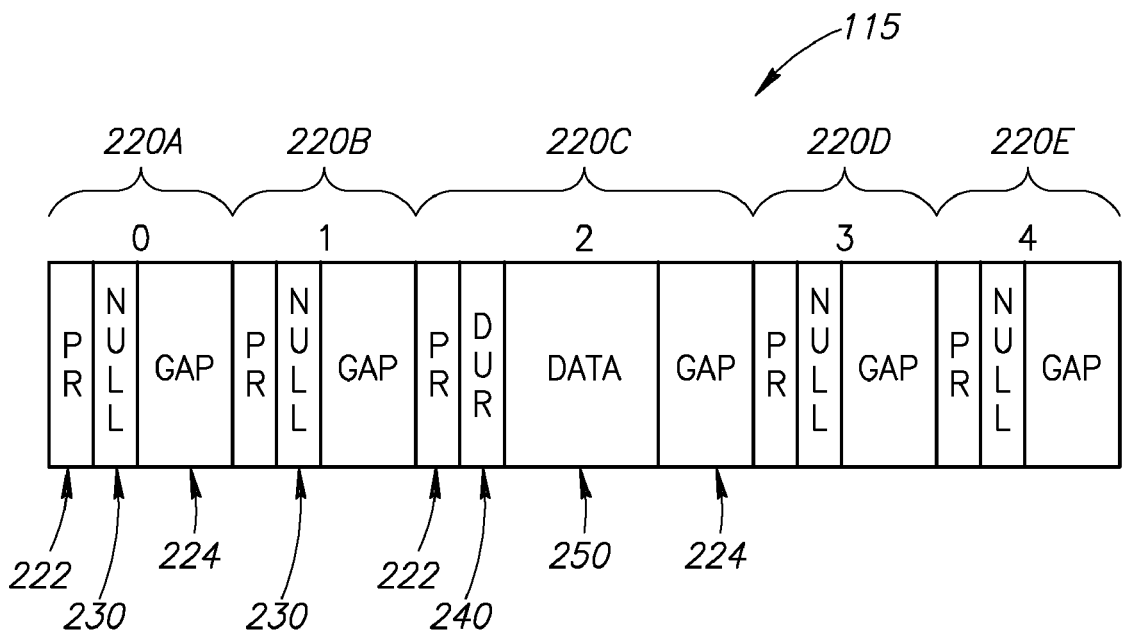
FIG. 2B is an illustration of a timing diagram for an exemplary transmission cycle operating in accordance with the schedule of FIG. 2A.

Reference is now made to FIGS. 2A and 2B. FIG. 2A illustrates a novel transmission start slot TDMA (time division multiple access) contention TXOP schedule 110, designed and operative in accordance with a preferred embodiment of the present invention. FIG. 2B illustrates timing diagram 115 for an exemplary transmission cycle operating in accordance with transmission start slot schedule 110.

Figure 1A:
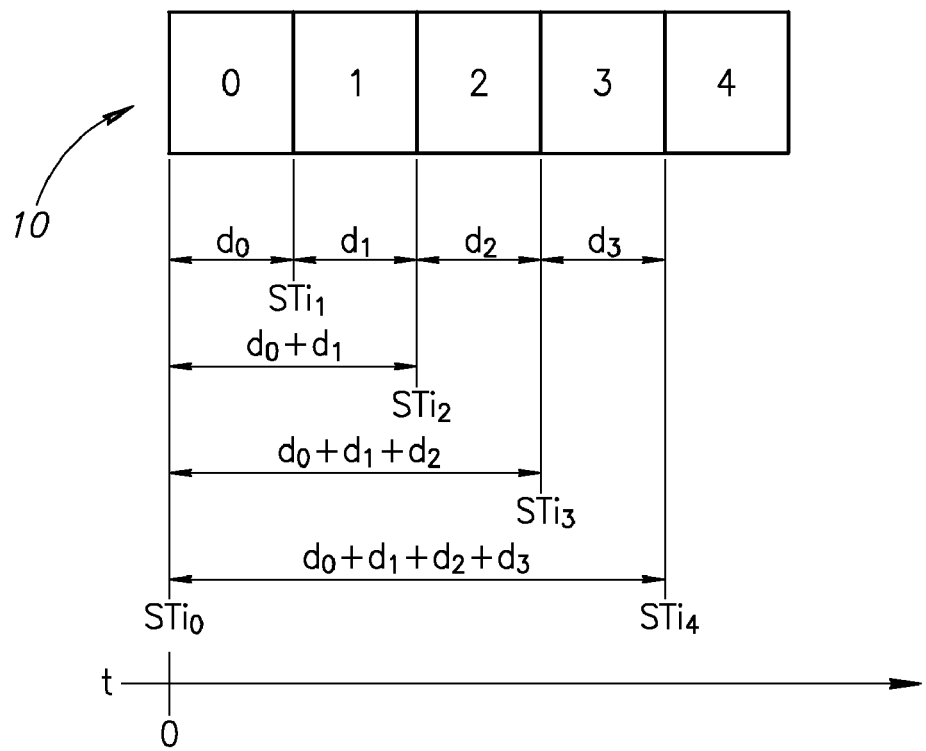
FIG. 1A is an illustration of a schedule of sub-burst slots according to an exemplary media access plan (MAP) operative in a network employing a collision avoidance/ carrier sensing media access (CA/CSMA) method.

As shown in FIG. 2A, schedule 110 may comprise a multiplicity of transmission start slots 120, herein labeled from 0, to 4. Each transmission start slot 120 has a scheduled minimum duration of d'. It will be appreciated that as will be described hereinbelow, d' may be slightly longer in duration than duration d in FIG. 1A. Unlike the prior art, transmission start slots may have a longer duration than a minimal transmission burst duration In accordance with a preferred embodiment of the present invention, nodes with nothing to transmit may not remain silent as in the prior art. Instead, each such node may transmit a short frame with a null indication when it has no data to transmit. FIG. 2B illustrates a timing diagram 115 for an exemplary transmission cycle based on transmission start slot schedule 110.

Transmission start slots 120 from FIG. 2A may be replaced by transmission frames 220 in FIG. 2B. Each transmission frame 220 may comprise a preamble 222 and a gap 224. A preamble 222 may represent an analog signal transmitted by a node at the beginning of a transmission frame 220. Gaps 224 may represent a period of non transmission "silence" at the end of a transmission frame. Gaps 224 may serve to demark the end of a frame 224 and make it easier for nodes to detect a subsequent preamble 222.

Transmission frame 220C (corresponding to transmission start slot 120C) represents a transmission of a node with a data payload to transmit. When a node has data to transmit, a duration 240 may be added as a part of a frame control (FC) with preamble 222. The FC may then be followed by data payload 250 and gap 224. Duration 240 may specify a new d' for the associated transmission start slot 120. For example, in FIG. 2A, transmission start slot 120C may have a scheduled duration of d'. However, duration 240 may indicate that the expected duration for transmission frame 220C may now be d' plus the expected duration of a transmission of data payload 250. A grid scheduler on the receiving node may use this information to update the grid of transmission opportunity start times originally represented by schedule 110.

Null symbols 230 may be used to indicate that a node has no data payload to transmit. Null symbols 230 may be included as a type field in, or in place of, an FC. As shown for exemplary transmission frames 220A, 220B, 220D and 220E corresponding to transmission start slots 120A, 120B, 120D and 120E from FIG. 2A, such nodes may indicate the transmission of "null frames" by transmitting a null 230 between preamble 222 and gap 224. It will be appreciated that other nodes may interpret a null frame as an indication that the transmitting node may have no data payload to transmit. In such a case it may be expected that a current transmission frame 220 may be of a standard length of d' and no other signal processing may be necessary until d' duration may have passed. In accordance with an alternative preferred embodiment of the present invention, a null frame may also comprise a duration 240.

Nodes on the network may therefore effectively "ignore" any ensuing transmissions until d' duration may have passed. Any transmissions received may be assumed to be random interference on the line, and accordingly may be ignored without requiring any interpretation or processing. In accordance with an alternative preferred embodiment of the present invention, during this time the nodes may enter an energy conservation mode by turning off their receivers.

It will be appreciated that the present invention may enable a receiving node to calculate when a next transmission frame 220 may be expected without having to rely on PCS. VCS may be used instead to determine exactly when a next frame may be expected.

In accordance with a preferred embodiment of the present invention, if a node misses a transmission frame 220, or cannot detect an FC correctly due to HCS error, it may stay silent and switch to PCS mode. It will be appreciated that transmission cycles 220 as shown in FIG. 2B may represent a simplified representation of the components of a typical transmission frame 220. For example, the FC for transmissions with data payloads may also comprise fields indicating the "current position" of the transmission within the grid of timeslot opportunities as represented in schedule 110. Such information on "current position" may be used by a node to resynchronize to the grid as necessary. For example, if line interference causes a node to lose synchronization, it may listen for a next transmission frame 220. When the next frame 220 may be received, resynchronization to the grid may be performed via the information in such fields. "Current position" information may include, for example, group and slot information as per the current schedule 110. It will be appreciated that such information may be exemplary; the present invention may be implemented with other such additional fields in the FC as necessary. If no other option may be feasible, a node may resynchronize when a new MAP is transmitted after the end of a transmission cycle 115.

Figure 1B:
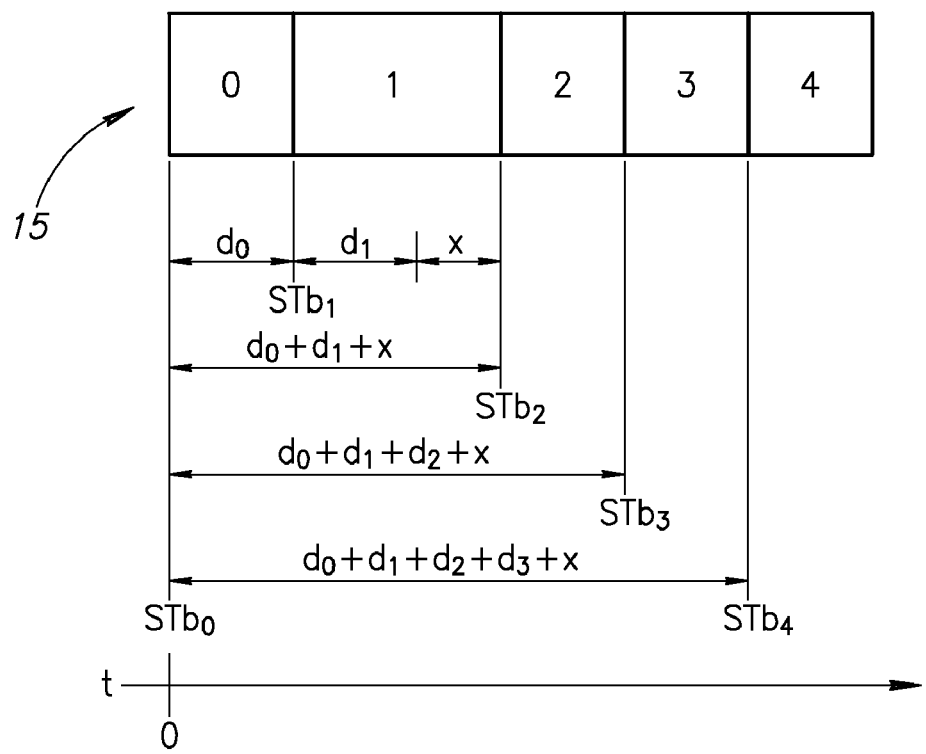
FIG. 1B is a timing diagram illustration for an exemplary transmission cycle for the schedule of FIG. 1.

It will be appreciated that TDMA transmission start slots media access may be less efficient than the prior art. The overhead required to transmit a null 230 along with preamble 22 and gap 224 may increase the duration of a null transmission frame 220 vis-à-vis a silent frame as represented in FIG. 1B. Such increased duration may reduce the bandwidth available for the transmission of data.

Figure 3A:
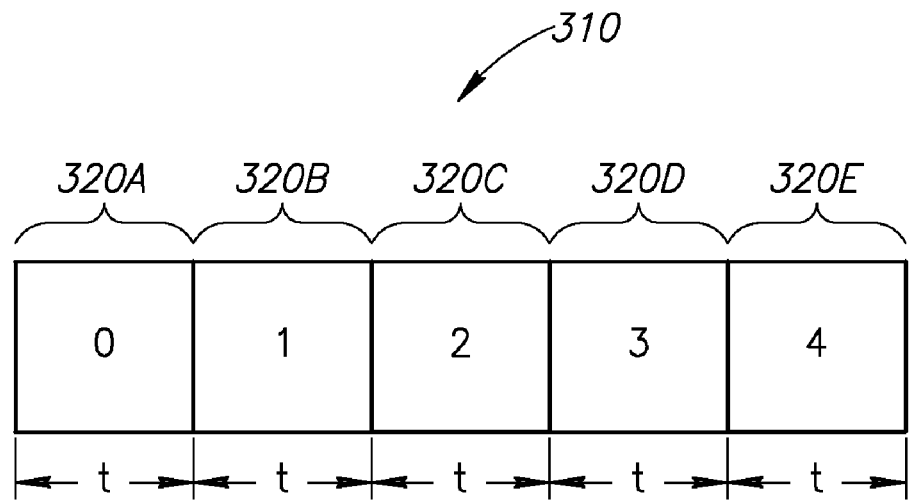
FIG. 3A is an illustration of a novel transmission start slot TDMA (time division multiple access) contention TXOP schedule, designed and operative in accordance with a preferred embodiment of the present invention.
Figure 3B:
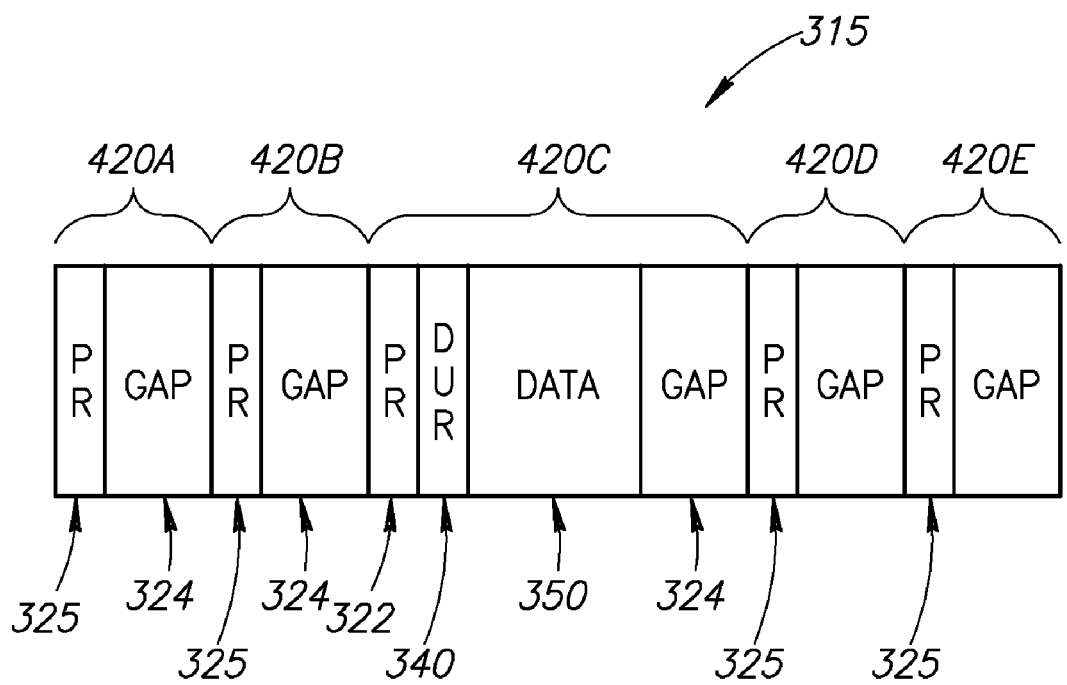
FIG. 3B is an illustration of a timing diagram for an exemplary transmission cycle operating in accordance with the schedule of FIG. 3A.

In accordance with an alternative preferred embodiment of the present invention, the duration of transmission cycles 220 may be reduced by removing nulls 230. Reference is now made to FIGS. 3A and 3B. FIG. 3A illustrates a novel transmission start slot TDMA (time division multiple access) contention TXOP schedule 310, designed and operative in accordance with a preferred embodiment of the present invention. FIG. 3B illustrates timing diagram 315 for an exemplary transmission cycle operating in accordance with transmission start slot schedule 310.

As shown in FIG. 3A, schedule 310 may comprise a multiplicity of transmission start slots 320, analogous to transmission start slots 120 in the embodiment of FIG. 2A. However, each transmission start slot 320 may have a scheduled minimum duration of t. As will be described hereinbelow, t may be shorter in duration than duration d' in FIG. 2A.

Transmission frames 420 in FIG. 3B may generally correspond to transmission start slots 320 in FIG. 3A. As in the previous embodiment, each transmission frame 420 may comprise a preamble 222. Durations 340 and data payloads 350 may also be used as in the previous embodiment. For example, transmission frame 420C, including a preamble 322, a duration 340 and gap 324, may represent a transmission from a node with data to transmit.

However, transmission frames 420 from nodes with no data payloads to transmit may be different than in the previous embodiment. Instead of transmitting a null 230 (FIG. 2B) to indicate a "null" transmission, such nodes may instead transmit a preamble 325. Preamble 325 may be an analog signal sufficiently different from preamble 322 to be recognized by receiving nodes as a different type of preamble. When a preamble 325 may be received, receiving nodes may interpret it to signal a null transmission without explicitly requiring a null 230 to be actually transmitted as well.

It will be appreciated that by eliminating the transmission of nulls 230, the duration of transmission frames 420 may be generally shorter than transmission frames 220. It will further be appreciated that transmission start slots 320 may be of shorter duration than transmission start slots 120. Duration t may be expected to be shorter than duration d'. An exemplary value of t may be equal to d, as in the prior art. Therefore, in accordance with a preferred embodiment of the present invention, schedule 310 may be of generally the same duration as schedule 10. Transmission start slots 320 may be sub-burst slots with a shorter duration than a minimal transmission burst duration It will be appreciated that the specification of a powerline medium is exemplary. The present invention may be implemented on any data network. It will further be appreciated that the specification of HPNA v3.1, may also be exemplary. The present invention may be implemented in accordance with other standards such as 802.11,, HPAV, and G,hn. It will be appreciated, however, that support for the present invention must be included the current specifications for a standard in order for such implementation to be successful.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method implemented on a network node comprising:
receiving an adjustable schedule of transmission start slots, wherein said transmission start slots represent transmission initiation opportunities for the initiation of data transmission by at least one of a said plurality of network devices on a network;
transmitting at least an indication of an expected duration in each said transmission start slot associated with said network node as per said schedule, wherein when said network node is not transmitting a data payload said indication is a specific analog preamble to indicate that said expected duration is unchanged from a current said expected duration; and
adjusting said adjustable schedule in accordance with said expected duration for each said transmission.

2. A method implemented on a network node comprising:
receiving an adjustable schedule of transmission start slots for a plurality of network devices on a network, wherein said transmission start slots represent transmission initiation opportunities for the initiation of data transmission by at least one of said plurality of network devices on a network;
transmitting at least information regarding a current transmitting position within said adjustable schedule; and
adjusting said adjustable schedule in accordance with said position.

3. The method according to claim 2 and wherein said information identifies at least one of: a said transmission start slot, said network node, and a group for said network node.

4. A method implemented on a network node comprising:
receiving an adjustable schedule of transmission start slots for a plurality of network devices on a network, wherein said transmission start slots represent transmission initiation opportunities for the initiation of data transmission by at least one of said plurality of network devices in a network;
listening for transmissions by other said network nodes according to said received schedule, wherein said transmissions also comprise information regarding a current transmitting position within said adjustable schedule; and
adjusting said received schedule in accordance with said position.

5. The method according to claim 4 and wherein said information identifies at least one of: a said transmission start slot, said network node, and a group for said network node.

6. The method according to claim 4 and also comprising synchronizing said received adjustable schedule in accordance with said information regarding a current transmitting position.

7. A method for virtual carrier sensing comprising:
receiving a schedule of transmission start slots on a network node, wherein said transmission start slots represent transmission initiation opportunities for the initiation of data transmission by at least one of a plurality of network devices in a network;
listening for transmissions by other said network nodes according to said received schedule, said transmissions indicating at least an expected duration of a current said transmission;
adjusting said received schedule in accordance with said indicating of a said data transmission; and
ignoring any subsequent transmissions until a next scheduled said transmission start slot in accordance with said adjusted schedule.

8. The method according to claim 7 and wherein said indicating is one of:
- an explicit said expected duration for a payload transmission;
- an explicit said expected duration for a null frame; and
- an implied said expected duration for a null frame, wherein said implied expected duration is unchanged from a current said expected duration as per said adjustable schedule.

9. The method according to claim 7 and wherein said indicating is in the form of an analog preamble.

10. The method according to claim 9 and wherein said specific analog preamble indicates that said network node is not transmitting a data payload and said expected duration is unchanged from a current said expected duration.

11. The method according to claim 10 and wherein said transmission start slots are sub-burst slots.

12. The method according to claim 7 and also comprising:
- processing only said indicating to determine said expected duration; and
- ignoring any other components of said transmissions.

13. The method according to claim 7 and also comprising reducing power consumption by turning off a receiver used for said listening when said transmissions are not expected as per said schedule.

14. The method according to claim 7 and wherein said listening comprises listening for said transmissions for specific said other said networks nodes, wherein the identity of said other said network nodes is known as per said received schedule.

15. The method according to claim 14 and wherein said network uses a powerline medium.

16. The method according to claim 7 and also comprising reducing power consumption by turning off a receiver used for said listening when said transmissions are not expected as per said schedule.

17. The method according to claim 7 and also comprising:
- transmitting according to said received schedule, said transmitting indicating at least an expected duration of a current said transmission; and
- adjusting said received schedule in accordance with said transmitting.

* * * * *